2 Sheets—Sheet 1.
J. M. MITCHELL & L. B. KENNEDY.
BRICK-MACHINE.
No. 170,879. Patented Dec. 7, 1875.
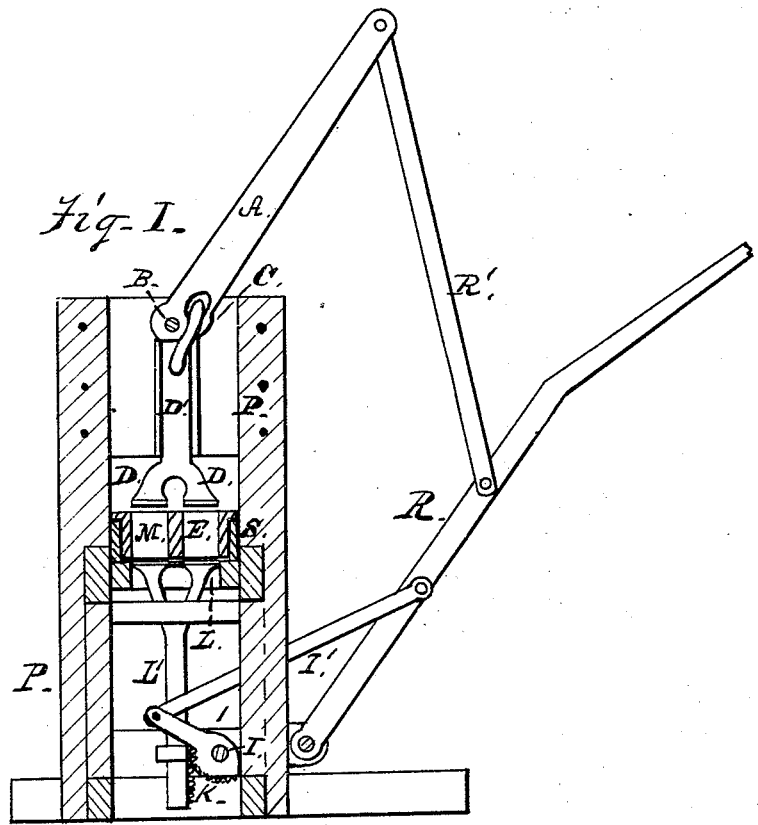
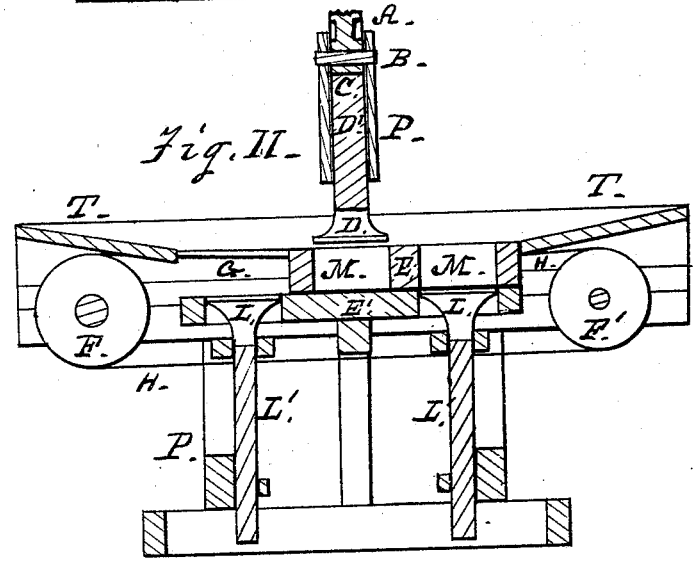
Witness:
Fred Greer
Levi B. Kennedy
Inventors:
James M. Mitchell
L. B. Kennedy
By Sam'l J. Wallace
Attorney 2 Sheets—Sheet 2.
J. M. MITCHELL & L. B. KENNEDY.
BRICK-MACHINE.
No. 170,879. Patented Dec. 7, 1875.
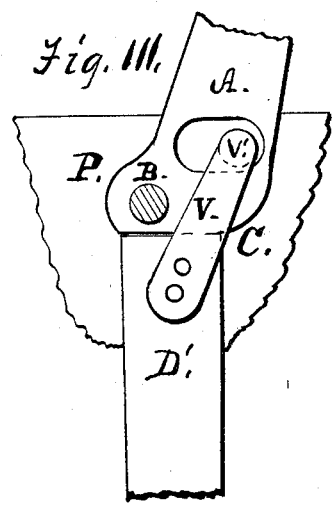
Fig. III.
Witness:
F. W. Tate
J. C. Holland
Inventors:
J. M. Mitchell.
L. B. Kennedy.
By Saml. J. Wallace.
Attorney.

UNITED STATES PATENT OFFICE.

JAMES M. MITCHELL, OF DUNLAP, AND LEWIS B. KENNEDY, OF KEOKUK, IOWA.

IMPROVEMENT IN BRICK-MACHINES.

Specification forming part of Letters Patent No. 170,879, dated December 7, 1875; application filed October 23, 1875.

*To all whom it may concern:*

Be it known that we, J. M. MITCHELL, of Dunlap, Harrison county, Iowa, and L. B. KENNEDY, of Keokuk, Lee county, Iowa, have invented a new and useful Improvement in Brick-Machines, which is made substantially as set forth hereinafter, referring to the accompanying drawings, in which—

Figures I and II show vertical sections, at right-angles to each other, of a portion of the machine. Fig. III is a detail of part of same.

This invention consists in certain useful improvements in the brick-machine patented to J. M. Mitchell December 9, 1873, made as hereinafter set forth.

The lever A turns on the pivot B in frame P, and is operated, as shown in the patent herein referred to, by connections from the second lever R. It has a cam, C, on its short end, arranged to press and turn on the end of plunger-bar D′, so as to push it downward. The movable mold-bed E runs on ways S, from side to side, under the plunger-bar D′. It has mold-holes M for the brick, arranged to come under plunger-heads D, so they may be driven into them to compress the clay in them into brick. This movable mold-bed E passes over a fixed bottom, E′, while under the plungers D, which acts as bottoms for the molds during compression. The movable mold-bed E is connected at its ends by cords G H to the windlass F, so that, when that is turned by its crank, the movable mold-bed E will be moved back or forth under or from the plungers D by the winding and unwinding of the cords. At and around the ends of the movable mold-bed E are stationary tables T to hold clay in suitable condition. When the molds with the hard compressed brick are run out from under plungers D, they pass over upward plungers L, which push the brick upward out of the mold to be carried away. A crank-arm on shaft I is connected with lever R so as to be operated by it. This shaft bears a wheel or segment, K, having on its rim either a cam or teeth arranged to connect with a bearing or rack on plunger-shaft L′, so as to raise or lower it by the action of lever R; this pushes up the plungers L into the mold, when the plungers D are driven down into the other set of molds, so as to discharge the brick. When the brick are removed fresh clay is drawn into the molds to form new brick, which is then run under the plungers D, while the opposite molds are run into a second set of plungers, L, which act in the same way, the molds being discharged and filled on the two sides alternately. The plunger-bar D′ has upward projections at its sides, engaging with sunken bearings in the sides of cam-head C, so that the bar D′, after being pushed down, will be drawn up again by the return of lever A out of the molds M.

The clay is used in that moderate state of dampness that it will compact by pressure into a firm and solid brick for hacking up.

We claim—

The lever A, having pivot B and cam C, in combination with brick-press plunger D, having guideways, and the connections by which the lever A raises the plunger after driving it down, substantially as set forth.

JAMES M. MITCHELL.
LEWIS B. KENNEDY.

Witnesses:
W. J. MEDES,
SAML. J. WALLACE.